(12) United States Patent
Liu et al.

(10) Patent No.: US 9,715,736 B2
(45) Date of Patent: Jul. 25, 2017

(54) METHOD AND APPARATUS TO DETECT ARTIFICIAL EDGES IN IMAGES

(75) Inventors: Debing Liu, Beijing (CN); Zhibo Chen, Beijing (CN); Xiaodong Gu, Beijing (CN)

(73) Assignee: Thomson Licensing, Issy les moulineaux (FR)

( * ) Notice: Subject to any disclaimer, the term of this patent is extended or adjusted under 35 U.S.C. 154(b) by 5 days.

(21) Appl. No.: 14/414,721

(22) PCT Filed: Aug. 9, 2012

(86) PCT No.: PCT/CN2012/079866
§ 371 (c)(1),
(2), (4) Date: Aug. 20, 2015

(87) PCT Pub. No.: WO2014/022998
PCT Pub. Date: Feb. 13, 2014

(65) Prior Publication Data
US 2016/0012607 A1  Jan. 14, 2016

(51) Int. Cl.
*G06K 9/48* (2006.01)
*G06T 7/00* (2017.01)
*H04N 19/86* (2014.01)

(52) U.S. Cl.
CPC ............ *G06T 7/0085* (2013.01); *H04N 19/86* (2014.11); *G06T 2207/10016* (2013.01); *G06T 2207/20012* (2013.01)

(58) Field of Classification Search
CPC ......... G06T 7/0085; G06T 2207/20012; G06T 2207/10016; G06T 7/13; H04N 19/86
USPC ....................................................... 382/199
See application file for complete search history.

(56) References Cited

U.S. PATENT DOCUMENTS

| | | | |
|---|---|---|---|
| 5,920,356 | A | 7/1999 | Gupta et al. |
| 7,006,255 | B2 | 2/2006 | Sun et al. |
| 2002/0126912 | A1 | 9/2002 | Rouvellou |
| 2004/0165785 | A1 | 8/2004 | Monobe et al. |
| 2006/0045376 | A1 | 3/2006 | Kwon |
| 2006/0110065 | A1 | 5/2006 | Huang et al. |
| 2006/0251174 | A1 | 11/2006 | Caviedes et al. |

(Continued)

FOREIGN PATENT DOCUMENTS

| | | |
|---|---|---|
| CN | 1741617 | 3/2006 |
| CN | 101783969 | 7/2010 |

(Continued)

OTHER PUBLICATIONS

R.V. Babu, A.S. Bopardikar, A. Perkis, and O.I. Hillestad, "No-Reference Metrics for Video Streaming Applications", Proceeding for International Packet Video Workshop, Dec. 2004.

(Continued)

*Primary Examiner* — Stephen R Koziol
*Assistant Examiner* — Amandeep Saini
(74) *Attorney, Agent, or Firm* — Brian J. Dorini; Xiaoan Lu

(57) ABSTRACT

The present invention generally relates to automatic detection of video artifacts. The present invention relates to automatically detect out the images with visible artifacts due to STB decoding error based on a generated artificial edge map. In particular, the application teaches a method to detect out the images with the visible artifacts and how to identify artificial edges from texture (natural) edges. The present system identifies that artificial edges are most significant in local area, while texture edges are often together with some other texture edges.

12 Claims, 7 Drawing Sheets

(56) References Cited

U.S. PATENT DOCUMENTS

2011/0222597 A1    9/2011  Xu et al.
2012/0044989 A1    2/2012  Ahuja et al.

FOREIGN PATENT DOCUMENTS

| CN | 10229299     | 12/2011 |
| CN | 102421008    | 4/2012  |
| EP | 0630149      | 12/1994 |
| EP | 2375748      | 10/2011 |
| JP | 2002290975   | 10/2002 |
| JP | 2002354256   | 12/2002 |
| WO | WO02093935   | 11/2002 |
| WO | WO2009121184 | 10/2009 |

OTHER PUBLICATIONS

H. Rui, C. Li and S. Qiu, "Evaluation of Packet Loss Impairment on Streaming Video", Proceeding of International Packet Video Workshop, Apr. 2006.

Dor Shabtay, Nissan Raviv and Yair Moshe, "Video Packet Loss Concealment Detection Based on Image Content", in 16th European Signal Processing Conference (EUSIPCO 2008), Aug. 25-29, 2008.

410

| $E_{i-m,j-3}$ | $E_{i-m,j-2}$ | $E_{i-m,j-1}$ | 0 | $E_{i-m,j+1}$ | $E_{i-m,j+2}$ | $E_{i-m,j+3}$ |
|---|---|---|---|---|---|---|
| ... | ... | ... | ... | ... | ... | ... |
| $E_{i-1,j-3}$ | $E_{i-1,j-2}$ | $E_{i-1,j-1}$ | $C_{i-1,j}$ | $E_{i-1,j+1}$ | $E_{i-1,j+2}$ | $E_{i-1,j+3}$ |
| $E_{i,j-3}$ | $E_{i,j-2}$ | $E_{i,j-1}$ | $C_{i,j}$ | $E_{i,j+1}$ | $E_{i,j+2}$ | $E_{i,j+3}$ |
| $E_{i+1,j-3}$ | $E_{i+1,j-2}$ | $E_{i+1,j-1}$ | $C_{i+1,j}$ | $E_{i+1,j+1}$ | $E_{i+1,j+2}$ | $E_{i+1,j+3}$ |
| ... | ... | ... | ... | ... | ... | ... |
| $E_{i+n,j-3}$ | $E_{i+n,j-2}$ | $E_{i+n,j-1}$ | 0 | $E_{i+n,j+1}$ | $E_{i+n,j+2}$ | $E_{i+n,j+3}$ |
| $E_{i+n+1,j-3}$ | $E_{i+n+1,j-2}$ | $E_{i+n+1,j-1}$ | $C_{i+n,j}$ | $E_{i+n+1,j+1}$ | $E_{i+n+1,j+2}$ | $E_{i+n+1,j+3}$ |

$$\begin{matrix} V_{i-m-1,j-16} & V_{i-m-1,j} = 0 & V_{i-m-1,j+16} \\ V_{i-m,j-16} & V_{i-m,j} & V_{i-m,j+16} \\ \cdots & \cdots & \cdots \\ V_{i-1,j-16} & V_{i-1,j} & V_{i-1,j+16} \\ V_{i,j-16} & V_{i,j} & V_{i,j+16} \\ V_{i+1,j-16} & V_{i+1,j} & V_{i+1,j+16} \\ \cdots & \cdots & \cdots \\ V_{i+n,j-16} & V_{i+n,j} & V_{i+n,j+16} \\ V_{i+n+1,j-16} & V_{i+n+1,j} = 0 & V_{i+n+1,j+16} \end{matrix}$$

FIG. 6

METHOD AND APPARATUS TO DETECT ARTIFICIAL EDGES IN IMAGES

This application claims the benefit, under 35 U.S.C. §365 of International Application PCT/CN2012/079866, filed Aug. 9, 2012, which was published in accordance with PCT Article 21(2) on Feb. 13, 2014 in English.

BACKGROUND OF THE INVENTION

Field of the Invention

The present invention generally relates to automatic detection of video artifacts.

Background Information

With the constant introduction of new features and cost reductions, reducing the time to market for new versions of set top boxes (STB) is critical to commercial success. Validation tests, such as stress tests, must be performed on the device to test its functions and stability. Validation tests consume a large portion of this time to market, so any reduction in the validation time will contribute to the commercial success of the product.

A stress test is one of the validation tests that are run over a long period of time, under different conditions such as temperature or humidity, in order to test the performance of the new STB. Since the tests are run over a long period of time, it is not practical for a developer to sit and watch the display in order to determine if a visible artifact has occurred with the picture. However, developers need to record those artifacts for debugging and product improvement.

Turning now to FIG. 1, two representations of an image comprising visible artifacts are shown 100. The right image 120 is the image having visual artifacts as displayed by the STB. The left image is the image edge map 110 depicting automatically detected visual artifacts according to a prior art method. Most of the visible artifacts shown in FIG. 110 are horizontal or vertical edges, so most of the existing methods detect the artifacts by checking the vertical/horizontal edges. However they only considered the direction and length of the edges, which results in many texture edges mistakenly identified as artificial edges. To reduce the number of false positives, they assume that the artificial edges exist at the boundaries of a macro block (MB) and only check the edges there. However this assumption is not true in some cases. For example, due to motion compensation or scaling, the position of the artificial edges may be not aligned with MB boundaries. It would therefore be desirable to have an automated process which can automatically detect out those frames and largely speed up the validation process while avoiding the above mentioned problems.

SUMMARY OF THE INVENTION

In accordance with an aspect of the present invention, an apparatus is disclosed. According to an exemplary embodiment, the apparatus comprises an input for receiving an image, a processor for generating an edge value for each of plurality of pixels within said image by weighting said each of said plurality of pixels with a plurality of neighboring pixels, and for generating a first continuous edge value if a plurality of said edge values exceed a first threshold, and for determining whether a second continuous edge exists in a region surrounding said first continuous edge, and for generating an indication of an artifact in response to determining that said second continuous edge does not exist; and a display for displaying said indication to a user.

In accordance with another aspect of the present invention, a method for detecting visual artifacts in a video frame or stream is disclosed. According to an exemplary embodiment, the method comprises steps of receiving an image, generating an edge value for each of plurality of pixels by weighting said each of said plurality of pixels with a plurality of neighboring pixels, generating a first continuous edge value if a plurality of said edge values exceed a first threshold, determining whether a second continuous edge exists in a region surrounding said first continuous edge; and generating an indication of an artifact in response to determining that said second continuous edge does not exist.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is a diagram showing a graphical representation of a determination of continuous edges in a local area according to an exemplary embodiment of the present invention;

FIG. 6 is a diagram showing a graphical representation of a long edge according to an exemplary embodiment of the present invention.

The exemplifications set out herein illustrate preferred embodiments of the invention, and such exemplifications are not to be construed as limiting the scope of the invention in any manner.

DESCRIPTION OF THE PREFERRED EMBODIMENTS

The characteristics and advantages of the present invention will become more apparent from the following description, given by way of example. One embodiment of the present invention may be included within an integrated circuit. Another embodiment of the present invention may comprises discrete elements forming a circuit. The exemplifications set out herein illustrate preferred embodiments of the invention, and such exemplifications are not to be construed as limiting the scope of the invention in any manner.

The system of an exemplary embodiment of the present application teaches a method and system to detect out the images with visible artifacts due to STB decoding error based on a generated artificial edge map. The system may also be used for other applications such as for detecting the artificial edges due to compression (blockiness) or packet loss, since those visible artifacts also have the similar features. In particular, the application teaches a method to detect out the images with the visible artifacts, such as those visible in FIG. 1 and how to identify artificial edges from texture (natural) edges. The present system identifies that artificial edges are most significant in local area, while texture edges are often together with some other texture edges.

The system looks to identify artificial edges from texture edges by using the relationship between the edges in the local area to distinguish artificial edges from texture edges. The system further looks to determine if an image has visible artifacts or not by determining if the ratio of the detected artificial edges over all pixels is higher than a threshold. If so, the image is marked as an image with visible artifacts. An additional advantage of this method is that it can be extended to detect other artifacts due to compression or packet loss.

The exemplary embodiment of the proposed method is described as used in 8-bit depth images/videos and the related parameters or thresholds are all set for 8-bit depth images/videos. This method and apparatus can be used for other application such as 10-bit depth or 12-bit depth image/video, the related parameters and thresholds need to be adjusted accordingly.

Figure 2:
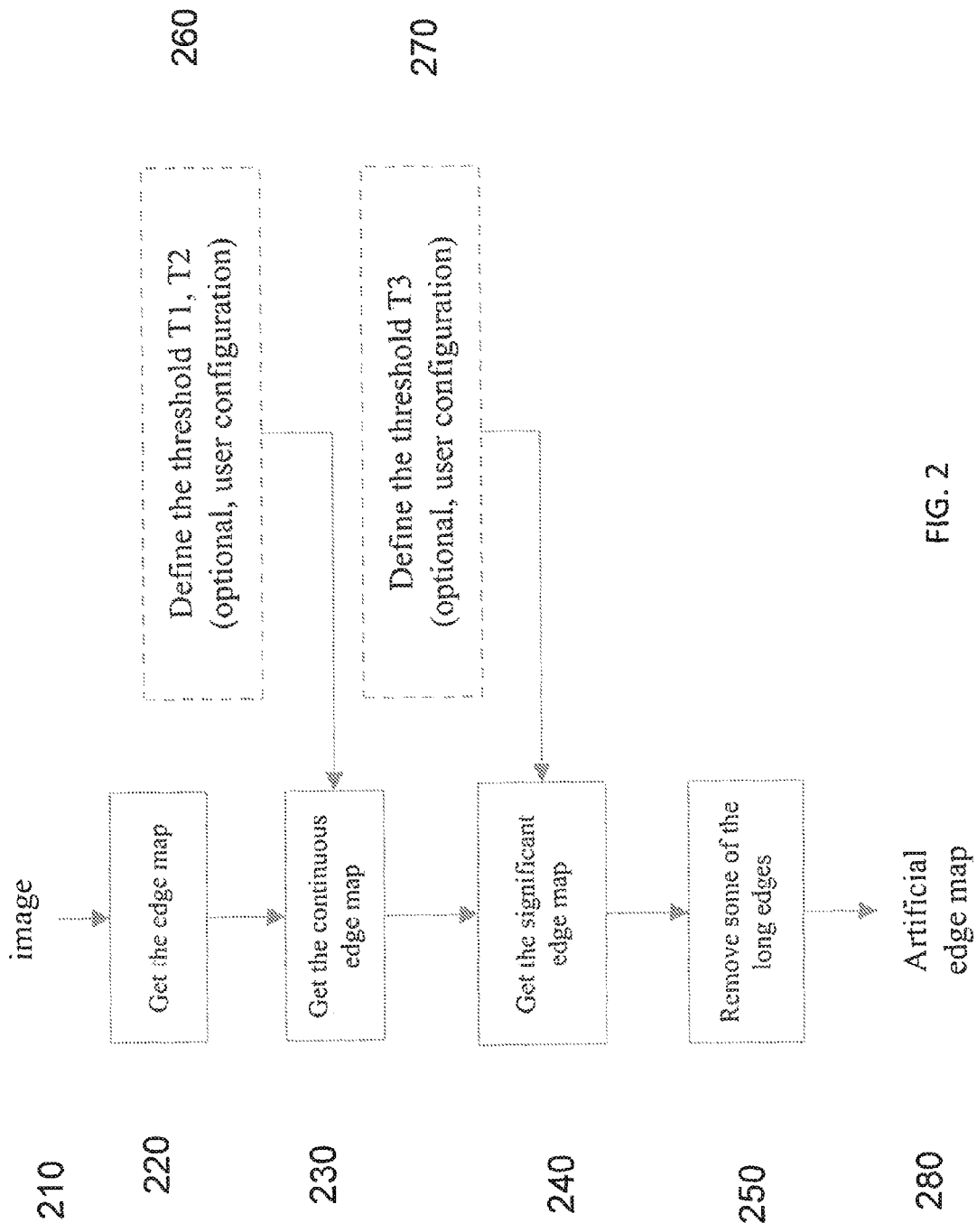
FIG. 2 is a flow chart showing a method according to an exemplary embodiment of the present invention.

Turning now to FIG. 2, a flow chart on how to generate an artificial edge map is shown. At the input, the system receives an image in YUV format 210 or the like, and the systems output is an artificial edge map 280. This flow chart represents the process to get the vertical artificial edge map. The horizontal artificial edge map can be generated in the same way.

When the program image is received 210, the system proceeds to mark out all the edges in an image, for example texture edges and artificial edges. For every pixel in an image, its edge value $E_{ij}$ is equal to zero if pixel (i, j) is at the top, right or bottom boundaries of the image. Otherwise, the edge value is equal to the weighted difference between the neighboring pixels.

$$E_{i,j} = \begin{cases} 0, & I_{i-1,j+1} \text{ or } I_{i+1,j+1} \text{ is not existed} \\ \left| (I_{i-1,j} - I_{i-1,j+1}) + 2 \times (I_{i,j} - I_{i,j+1}) + (I_{i+1,j} - I_{i+1,j+1}) \right| / 4, & \text{else} \end{cases} \quad (1)$$

Figure 3:
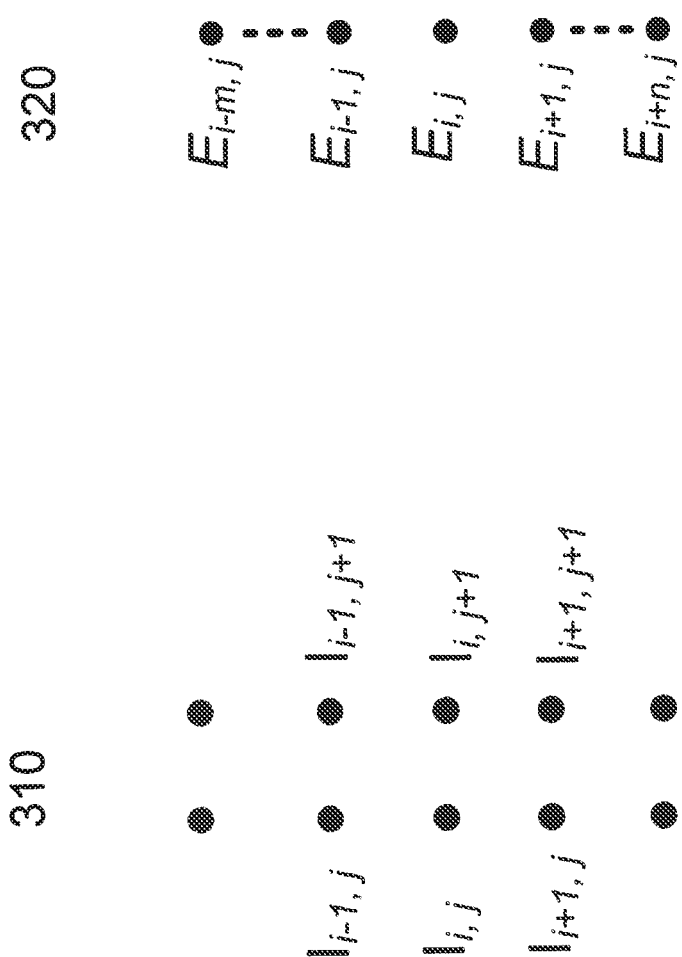
FIG. 3 is a diagram graphically illustrating a pixel map and an edge pixel map according to an exemplary embodiment of the present invention.

Turning now to FIG. 3, the above formula is graphically illustrated, where $E_{i,j}$ is the edge value of the pixel in ith row and jth column, $I_{i,j}$ is the luminance value of the pixel in ith row and jth column. For the pixels at the right, top or bottom boundaries of the image, their or $I_{i-1,j+1}$ or $I_{i+1,j+1}$ are nonexistent. In this case, their edge values are set to 0.

Returning to the method of FIG. 2, after the edge map is determined 220, the continuous edge map is determined 230. The meaning of continuous edge, i.e., the edge values from $E_{i-m,j}$ to $E_{i+n,j}$, is that all edge values higher than a threshold is illustrated in FIG. 3. These edge values form a continuous edge. The length of the continuous edge is defined as the number of the edge values (i.e. m+n). For an artificial edge to be noticed by the human eye there should be a continuous edge and its length should be higher than a threshold. Therefore in this step, we keep continuous edges and remove the separated edges. Continuous edge value $C_{ij}$ is equal to $E_{ij}$ if it belongs to a continuous edge whose length is higher $T_2$. Otherwise it is set to zero, i.e., if the length of a continue edge is lower than T2, all the Cij in the continuous edge will be set to zero $$C_{i,j} = \begin{cases} E_{i,j}, & \text{all edge values from } E_{i-m,j} \text{ to } E_{i+n,j} \geq T_1 \text{ and } m+n \geq T_2 \\ 0, & \text{else} \end{cases}$$

$T_1$ and $T_2$ are two predefined thresholds. Users or manufacturers may optionally change them for different applications 260. For example, for stress test of an STB receiving the image of FIG. 1, considering the gradient and the length of most of the artificial edges, T1 and $T_2$ may be set as 12 and 6 separately.

The significant edge map 240 is then determined from the continuous edge map. Texture edges are often concentrated in local area with some other same level texture edges, while artificial edges are often much outstanding than other neighboring texture edges. Texture edges are then distinguished from artificial edges by comparing the edge value in local area. Using this criteria most of the texture edges can be removed while keep the artificial edges.

Turning now to FIG. 4, determination of continuous edges in a local area is illustrated. The continuous edge values from $C_{i-m,j}$ to $C_{i+n,j}$ are calculated previously (FIG. 2, 230). The size of the local area is determined according to design conditions. In this exemplary embodiment the local area shown 410 comprises m+n rows and 7 columns and is shown as the shaded portion. The height of the local area is determined by the continuous edge value. It requires that all the values from $C_{i-m,j}$ to $C_{i+n,j}$ must not be 0. Moreover $C_{i-m-1,j}$ and $C_{i+n+1,j}$ must be 0 if they are existed (i.e. $C_{i-m,j}$ is not at the top and $C_{i+n,j}$ is not at the bottom). The width of the local area is 7 (3 columns at the left and 3 columns at the right).

First the average edge value from $C_{i-m,j}$ to $C_{i+n,j}$ are calculated to determine whether or not the continuous edge values are outstanding in local area. $\overline{C}$ is averaged from all the $C_{ij}$ in a continuous edge. Here a continuous edge means multiple neighboring pixels whose continuous edge value is not zero.

$$\overline{C} = \text{average}(C_{i+k,j}) \quad k=-m,\ldots,-1,0,1,\ldots,n$$

Next an average value is calculated by averaging all the edge values higher than a threshold for every column in the local area. Here $T_3$ is a threshold for texture edge. In an exemplary embodiment, its value is 5. If in one column all the edge values are lower than $T_3$, the average edge value is set as 0. $\overline{E}_d$ is averaged from the edge value of the selected pixels in column j+d. Please note here it does not check the continuous edge value, but the edge value. In column j+d, from row i−m to i+n, only if the edge value is higher than T3, it is included into the average calculation.

$$\overline{E}_d = \text{average}(E_{i+k,j+d}) \quad E_{i+k,j+d} > T_3; \quad k=-m,\ldots,n; \quad d=-3,-2,-1,1,2,3$$

Finally the calculated two average values are compared. If there exists an edge in same level, then all the continuous edge values from $C_{i-m,j}$ to $C_{i+n,j}$ are set to 0. If the upper condition in the formula below is not satisfied for all the 6 columns in the local area, this means the continuous edge from $C_{i-m,j}$ to $C_{i+n,j}$ is most significant in the local area, then the continuous edge values are kept. Here α is a parameter to define the significance of the continuous edge. Its default value is 0.6. $V_{i+k,j}$ is the edge value after the significant edge map is determined 240. Here it checks the 6 neighboring columns one by one, only if the $\overline{E}_d$ of one column satisfies the condition, $V_{i+k,j}$ (k is from −m to n) are set to zeros.

$$V_{i+k,j} = \begin{cases} 0, & k = -m, \ldots, n; \overline{E_d} \geq \overline{C} - 5 \text{ or } \overline{E_d} \geq \alpha \times \overline{C}; \\ C_{i+k,j}, & \text{else} \end{cases}$$

Figure 5:
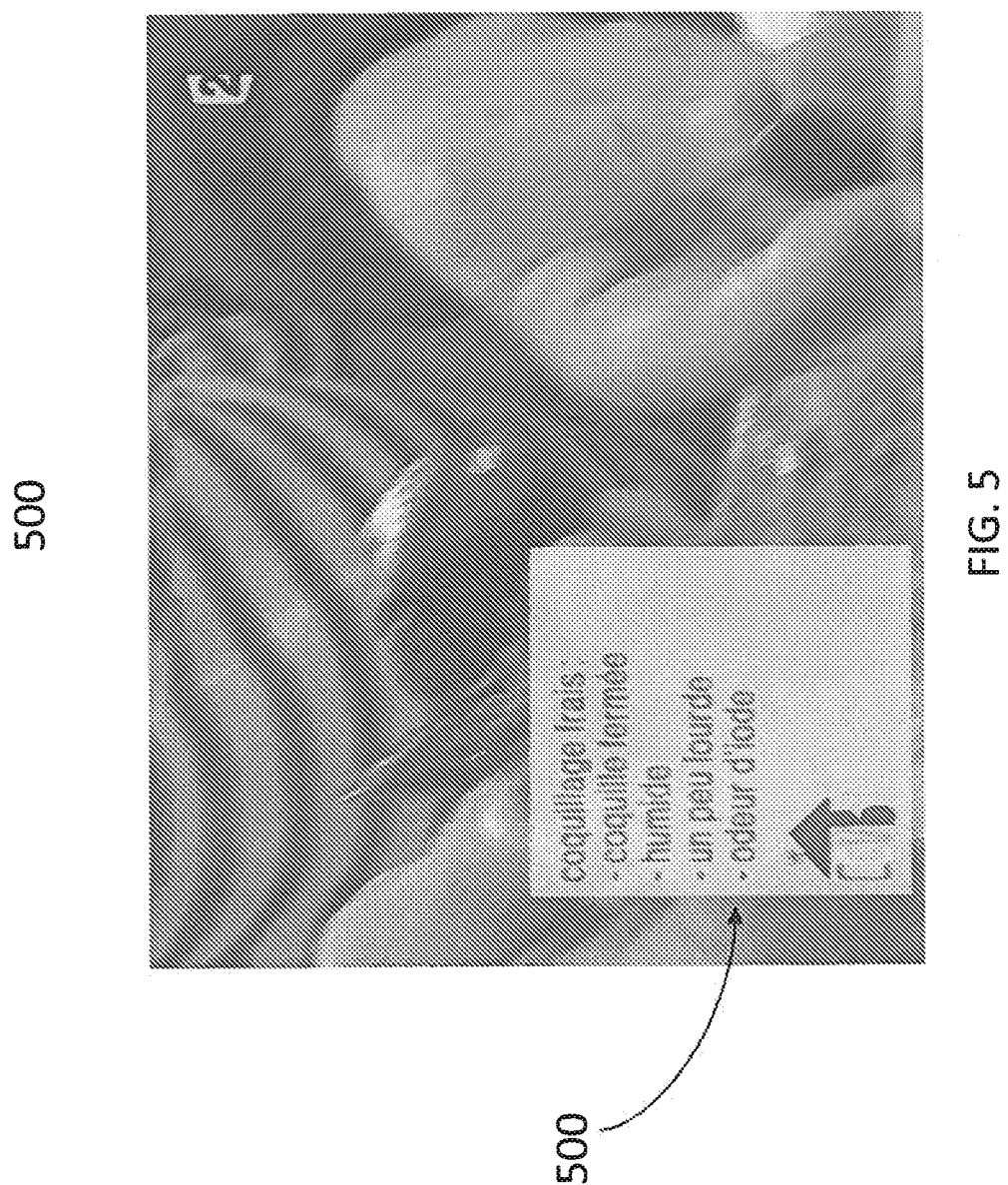
FIG. 5 is a diagram showing an example an image having a manually added significant edge according to an exemplary embodiment of the present invention.

After the significant edge map is determined 240, most the texture edges have been removed. In an optional next step in the exemplary method, a special case is processed. Turning now to FIG. 5, a note is manually added at the bottom left of the image. Its edge is also significant in the local area, so in previous calculations, its edges have been kept. However for our application, it is desirable to locate the artifacts due to STB decoding error, not intentionally applied continuous edges. Another example of this kind of edge may be black edges at the left and right of a 4:3 image displayed in an HD 16:9 screen.

This type of edge is only exists occasionally in an image, so only when the length of the edge is long enough, it can have some influence on the final result. Therefore, the system will only check the edge whose length is higher than a predetermined threshold. For example, in the exemplary embodiment, the threshold could be set to 17. If an artificial edge due to STB decoding error is longer than 17, it is therefore a very strong artifact since the artificial edge has exceed one MB, there often exists another corresponding artificial edge at the other side of the MB.

Base on the observation, these kind of edges can be identified and removed by checking their corresponding edges. Turning now to FIG. 6, if the continuous edge from $V_{i-m,j}$ to $V_{i+n,j}$ is a long edge (All edge values from $V_{i-m,j}$ to $V_{i+n,j}$ are not 0 and m+n>17), then the edge values from $V_{i-m,j-16}$ to $V_{i+n,j-16}$ are checked. If there exists a corresponding edge at j−16, so the edge values from $V_{i-m,j}$ to $V_{i+n,j}$ are kept. Here $N_{nonzero}$ is the number of the nonzero edge values from $V_{i-m,j-16}$ to $V_{i+n,j-16}$. If the condition is not satisfied, another checking on the edge values from $V_{i-m,j+16}$ to $V_{i+n,j+16}$ is conducted in the same way. Only if there exists an edge whose length is higher than at j−16 or j+16, the edge values from $V_{i-m,j}$ to $V_{i+n,j}$ are kept, or else all the edge values from $V_{i-m,j}$ to $V_{i+n,j}$ are set to 0.

$$N_{nonzero} \geq 0.5 \times (m+n)$$

Figure 1:
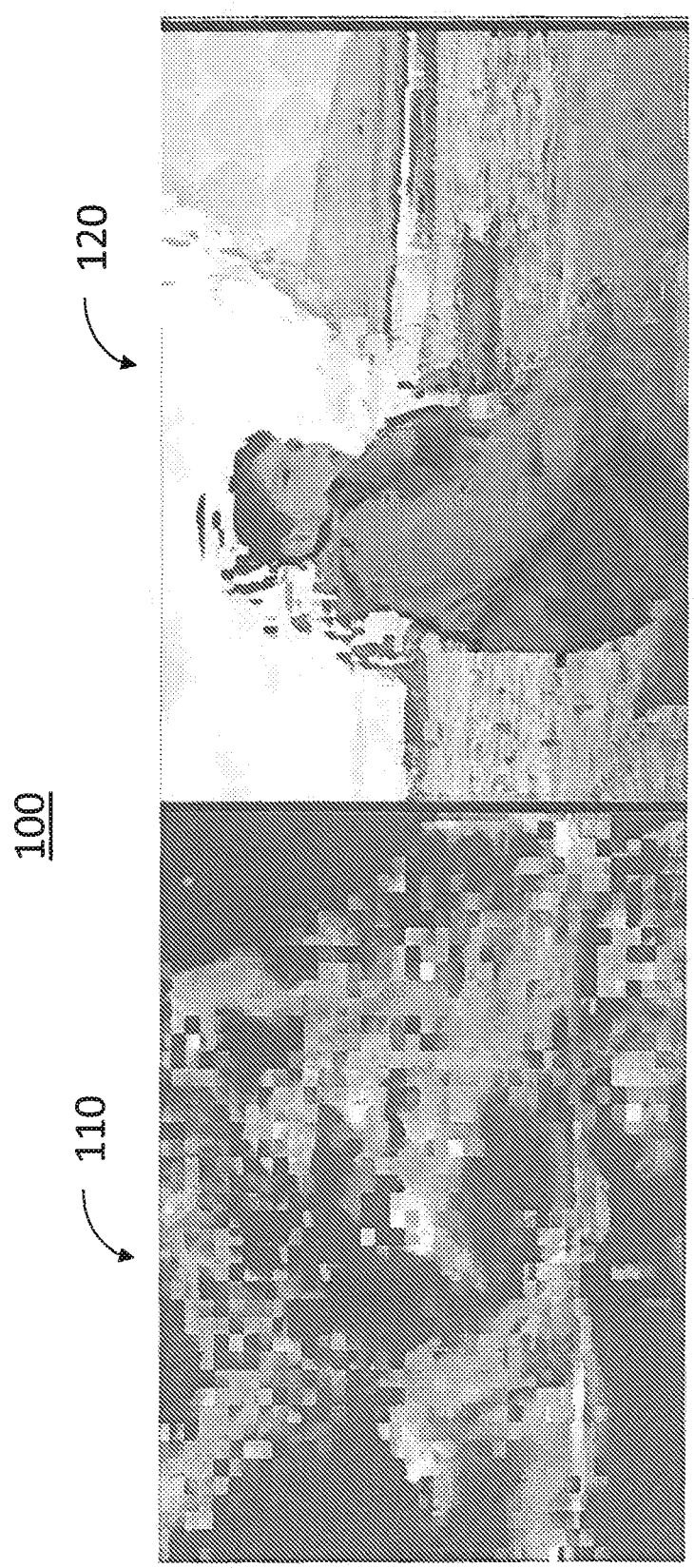
FIG. 1 is a diagram showing two exemplary images comprising artificial edge artifacts.

After an artificial edge map is generated, it can be used for different applications. For example, to detect out the image with visible artifacts due to STB decoding error (as shown in FIG. 1).

Firstly a ratio of the artificial edges over all the pixels is calculated, $$r = \frac{N_v}{N_t}$$

where r is the ratio, $N_v$ and $N_t$ are the number of the nonzero edge values and the total number of the pixels separately.

The calculated ratio is compared with a predefined threshold $T_4$. If $r \geq T_4$, the image is marked as with visible artifact, or else it is marked as with no visible artifact. $T_4$ can be changed optionally by users for different content or different scenarios. For this exemplary embodiment, the default value is 0.001.

Figure 7:
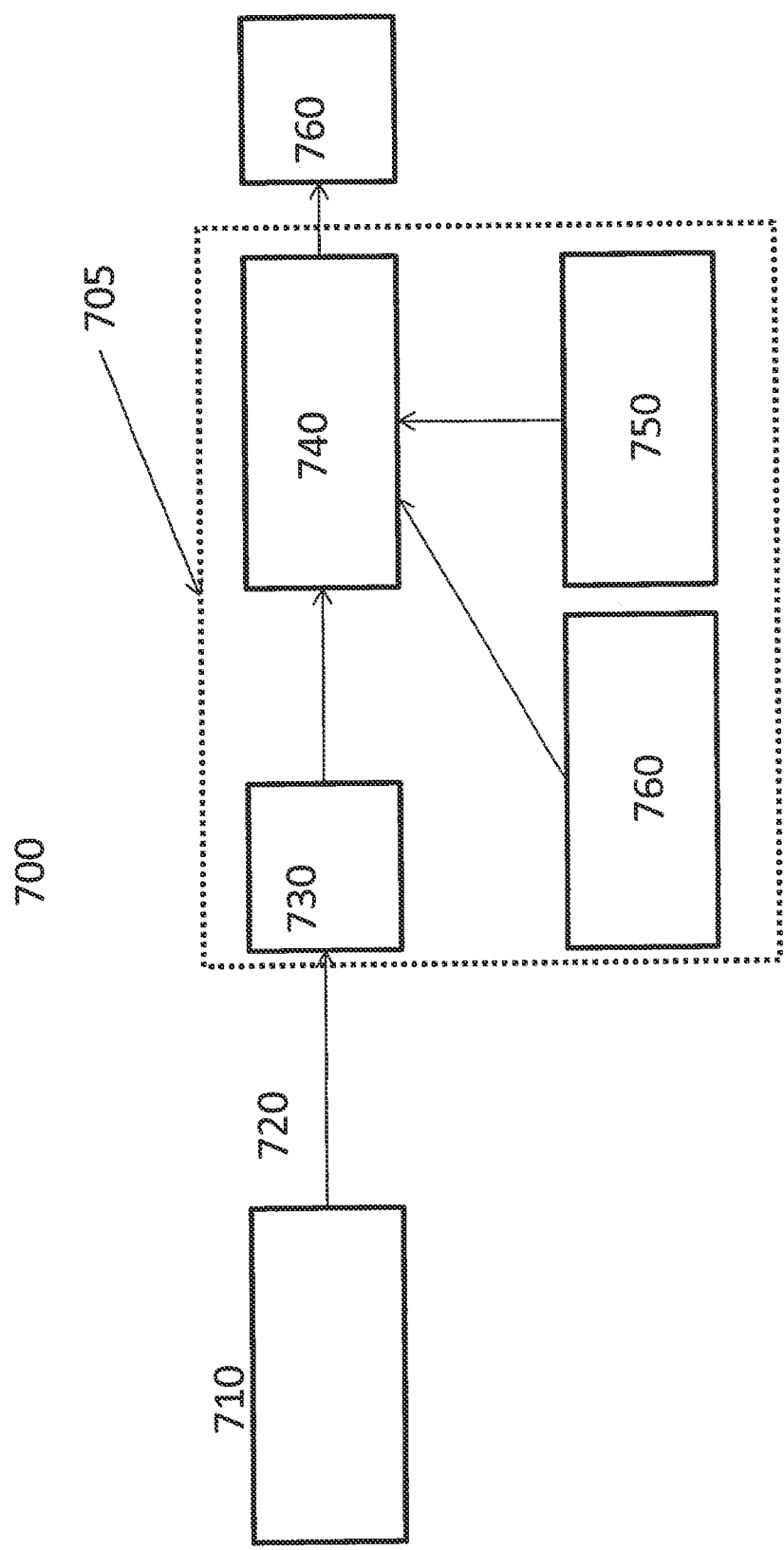
FIG. 7 is a diagram showing an apparatus for implementing the method according to an exemplary embodiment of the present invention.

Turning now to FIG. 7, a system comprising an image processing apparatus for implementing the present invention is shown 700. The image processing apparatus 705 comprises an input 730 for receiving an image from a set top box 710 or the like. The image is coupled from to input 730 via a cable 720 or similar transmission medium. The image is them coupled from the input 730 to the processor 740. The processor 740 is operative to process the image to generate an image map as described previously. Once the image map is generated, it is could to a display for examination by a user. Alternatively, the image map could be stored on a storage medium 760, and an indication could be made via an LED for example, or a text log or message, indicating the existence of the image map and any qualities associated with it, such as the presence of an undesirable artifact. In addition, a user interface 750 could be provided to facilitate the input of thresholds as described previously, or other test characteristics. This user interface 750 could be in the form or a touch screen or a keyboard.

As described herein, the present invention provides an architecture and protocol for detecting visual artifacts in an image. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method comprising:
   receiving an image;
   generating an edge value for each of a plurality of pixels by weighting said each of said plurality of pixels with a plurality of neighboring pixels;
   generating a first continuous edge if a plurality of said edge values exceed a first threshold and a number of consecutive edge values exceeding said first threshold exceeds a second threshold;
   determining whether a second continuous edge exists in a region surrounding said first continuous edge; and
   generating an indication of an artifact in response to determining that said second continuous edge does not exist.

2. The method of claim 1 wherein said generating an indication of an artifact further comprising:
   determining whether said first continuous edge exceeds a third threshold in length, wherein said generating an indication of an artifact is further in response to determining that said first continuous edge does not exceed said third threshold in length.

3. The method of claim 1 wherein said first threshold is a predetermined weighted difference between neighboring pixels.

4. The method of claim 1 wherein said second threshold is a predetermined number of consecutive edge values which exceed said first threshold.

5. The method of claim 2 wherein said third threshold is a predetermined number of consecutive edge values greater than said second threshold.

6. The method of claim 1 wherein a luminance value is determined for each of said plurality of pixels.

7. An apparatus comprising:
   a processor configured to generate an edge value for each of a plurality of pixels within an image by weighting said each of said plurality of pixels with a plurality of neighboring pixels, and to generate a first continuous edge if a plurality of said edge values exceed a first threshold and a number of consecutive edge values exceeding said first threshold exceeds a second threshold, and to determine whether a second continuous edge exists in a region surrounding said first continuous edge, and to generate an indication of an artifact in response to determining that said second continuous edge does not exist.

8. The apparatus of claim 7 wherein said processor is further operative to determine whether said first continuous edge exceeds a third threshold in length and to generate said indication of an artifact in response to determining that said first continuous edge does not exceed said third threshold in length.

9. The apparatus of claim 7 wherein said first threshold is a predetermined weighted difference between neighboring pixels.

10. The apparatus of claim 7 wherein said second threshold is a predetermined number of consecutive edge values which exceed said first threshold.

11. The apparatus of claim 8 wherein said third threshold is a predetermined number of consecutive edge values greater than said second threshold.

12. The apparatus of claim 7 wherein a luminance value is determined for each of said plurality of pixels.

* * * * *